United States Patent [19]

Coughran, Jr.

[11] 3,989,075

[45] Nov. 2, 1976

[54] TREE HARVESTER

[75] Inventor: Samuel J. Coughran, Jr., Cedartown, Ga.

[73] Assignee: Rome Industries, Cedartown, Ga.

[22] Filed: May 30, 1975

[21] Appl. No.: 582,363

[52] U.S. Cl. .............................. 144/34 R; 37/2 R; 144/2 N; 144/309 AC

[51] Int. Cl.[2] .............................. A01G 23/08

[58] Field of Search .......... 144/2 N, 2 Z, 3 D, 34 R, 144/34 E, 309 AC; 47/1.7; 37/2 R

[56] References Cited

UNITED STATES PATENTS

| | | | |
|---|---|---|---|
| 2,530,399 | 11/1950 | Pilgrim | 144/2 N |
| 2,863,258 | 12/1958 | Gish | 37/2 R |
| 3,738,401 | 6/1973 | Wiklund et al. | 144/34 R |
| 3,822,730 | 7/1974 | Hultdin et al. | 144/34 R |
| 3,914,883 | 10/1975 | Bodine | 37/2 R |

*Primary Examiner*—Leonidas Vlachos
*Assistant Examiner*—W. D. Bray
*Attorney, Agent, or Firm*—Newton, Hopkins & Ormsby

[57] ABSTRACT

A tree harvester functions to extract the entire tree trunk and attached tap root by gripping the tree above ground and sinking a "cookie cutter" around the trunk to sever the lateral root system. The cutter assembly is also provided with pressure foot plates which compact the soil and ultimately create sufficient upward force on the gripper to uproot or extract the tree.

10 Claims, 6 Drawing Figures

TREE HARVESTER

BACKGROUND OF THE INVENTION

Many devices have been developed for cutting or harvesting trees with the aid of machines. For example, one class of such devices involves an attachment to a tractor or other vehicle which acts to cut the tree trunk very close to the ground surface. These machines may take the form of circular saws or the like or they may be power shears but in any event they are characterized by the fact that although the tree trunk is severed very close to the ground surface in many cases, there is still left a stump to which the root system of the tree remains attached. Not only does the stump occupy space which could otherwise be used for planting, but also the stump and underlying tap root section of the tree represent potentially valuable material which is lost in the conventional harvesting process. It would be desirable to provide a tree harvesting device which removes the stump entirely and as much of the underlying root system as is practicable.

BRIEF SUMMARY OF THE INVENTION

The present invention relates to a tree extractor which removes sections of the tree normally left behind by ordinary harvesting devices. In particular, the present invention is directed to a tree extractor assembly which serves to extract the entire tree trunk and a portion of the underlying root system, particularly the tap root, by gripping the tree trunk above the ground surface and then severing the lateral root system underlying the trunk, ultimately to exert a sufficiently large upward reaction force on the gripping assembly as causes the same physically to uproot or extract the tree.

The gripper jaw assembly is formed in two sections hingedly connected together and the cutter assembly is also in two sections. The cutter assembly also acts as a pressure foot which compacts the soil as the cutter operates to severe the lateral root system around the tree trunk ultimately to provide a bearing support which terminates downward movement of the cutter and causes the gripper assembly to move upwardly thereby to uproot or extract the tree.

BRIEF DESCRIPTION OF THE DRAWING FIGURES

DETAILED DESCRIPTION OF THE INVENTION

Figure 1:
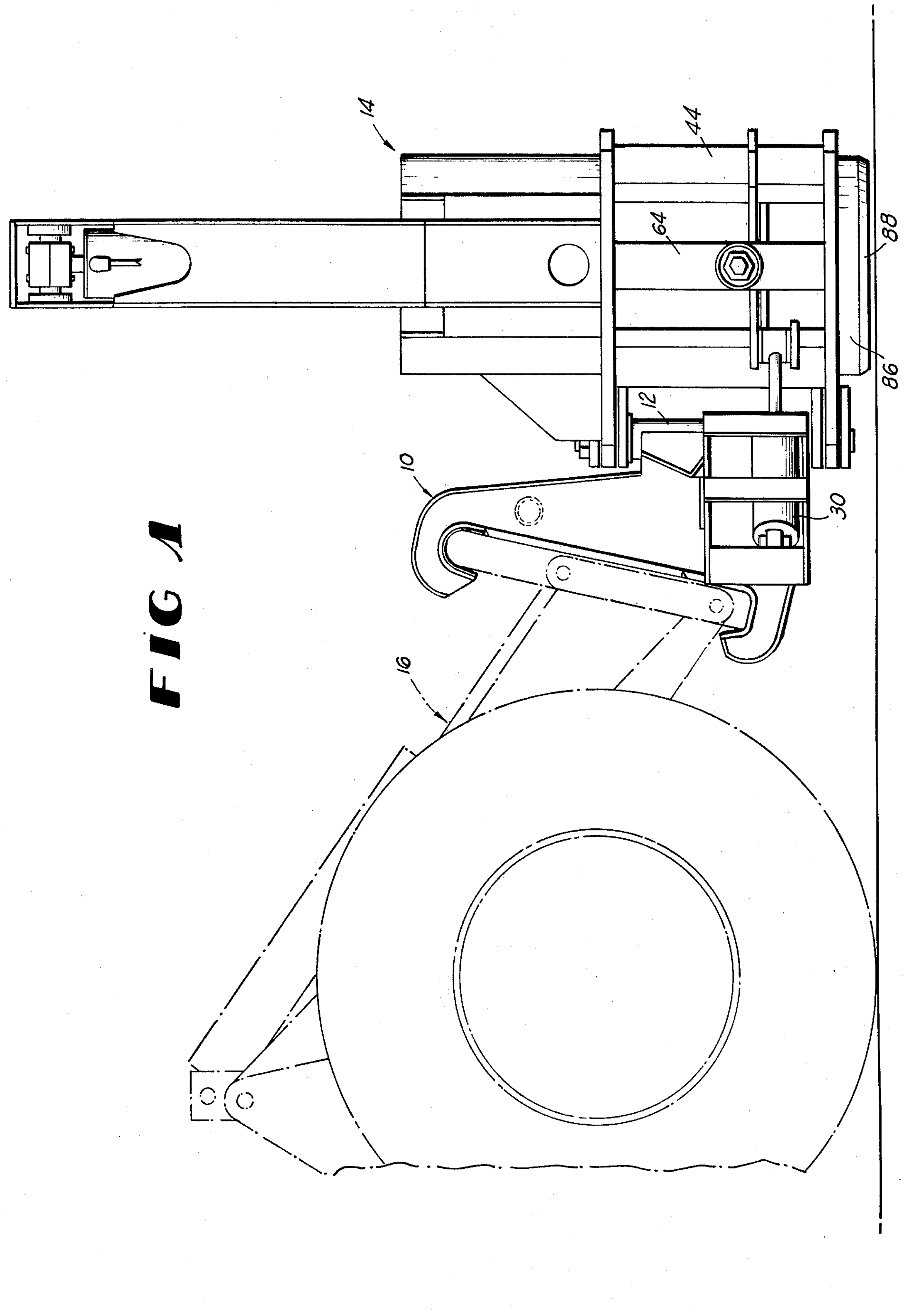
FIG. 1 is a side elevation of a device according to the present invention showing the manner of attachment to an associated vehicle.

With reference to FIG. 1, reference character 10 indicates a carriage or frame which includes a vertical pivot post assembly 12 which mounts the tree extractor mechanism 14 proper and which frame is adapted to the conventional hitch assembly 16 of an associated vehicle so as to be carried about from place-to-place by the vehicle and, as is conventional, to be moved vertically by the hitch assembly 16. As can be seen more clearly in FIGS. 3 and 4, the carriage or frame 10 includes the two upright portions 18 and 20 which are attached to a common base plate assembly 22 having the lateral extensions or wings 24 and 26, the uprights 18 and 20 being further rigidified by a cross brace member 28 as illustrated. The base member 22 preferably is built up from cold rolled sheet elements or the like and is so constructed as to lend sufficient rigidity to the device. The two wings 24 and 26 pivotally mount one end of the respective piston/cylinder assemblies 30 and 32 which, as will be understood by those in the art, preferably are of the double acting hydraulically actuated type, the associated vehicle providing the necessary hydraulic fluid pressure source and control whereby the assemblies 30 and 32 can be extended/retracted under control of the vehicle operator.

Figure 3:
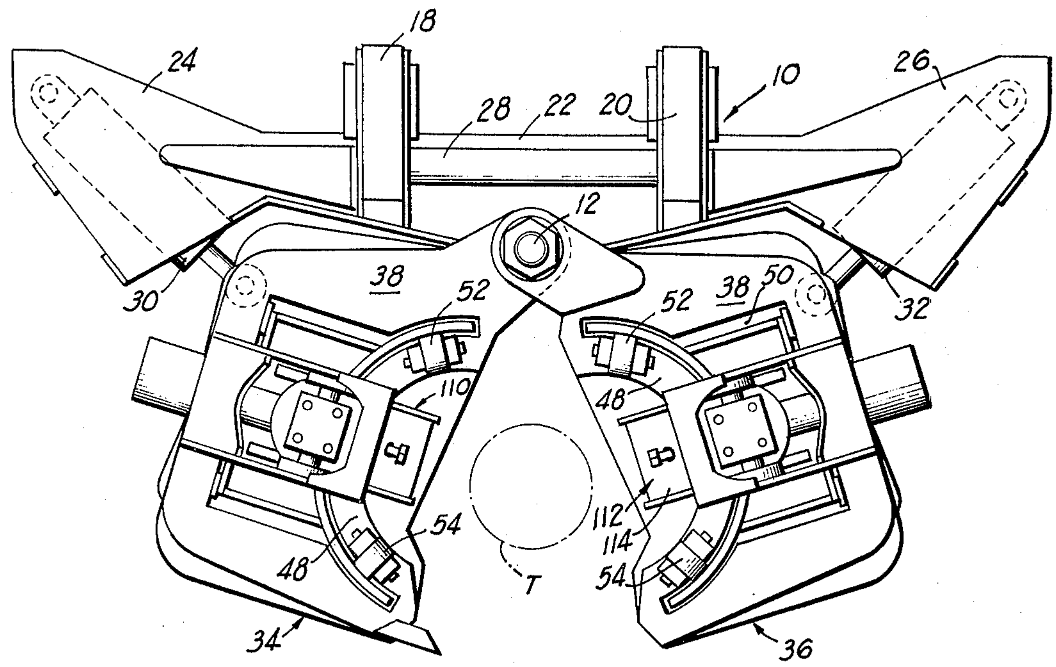
FIG. 3 is a plan view of the assembly shown in FIG. 2.
Figure 4:
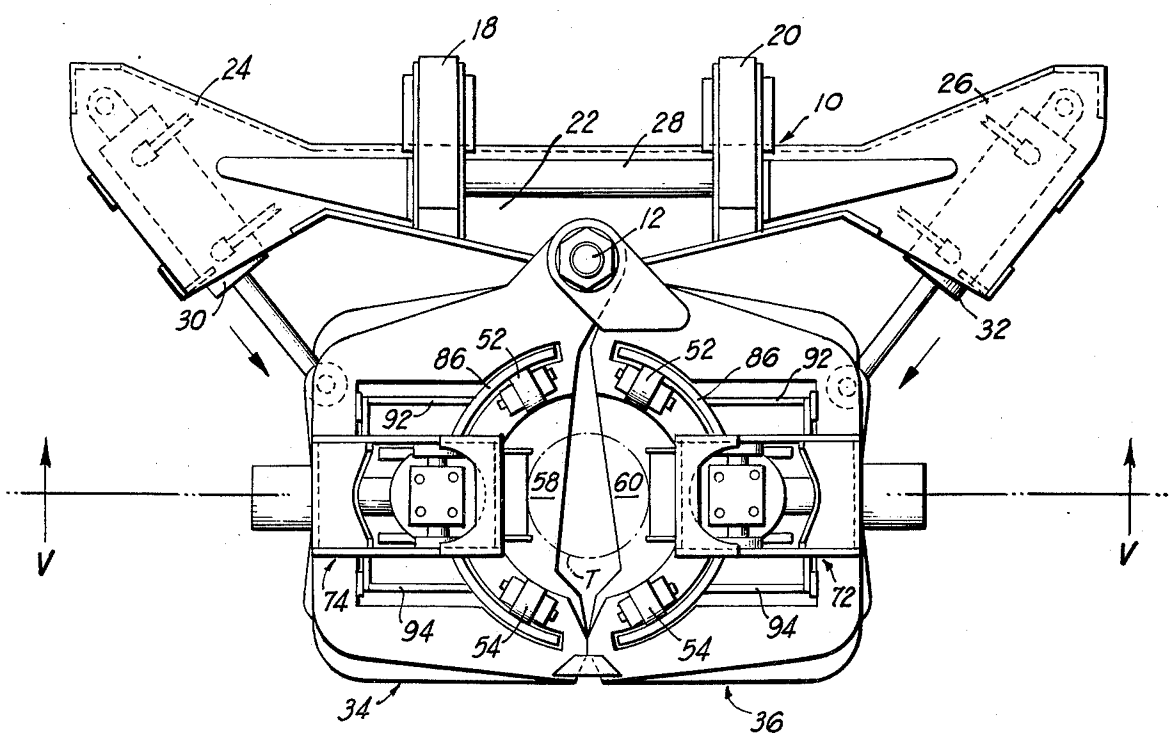
FIG. 4 is a plan view of the assembly showing the gripper jaws in the closed position.

The pivot assembly 12 serves as the hinge axis for a pair of gripper jaw assemblies indicated generally by the reference characters 34 and 36 in FIGS. 3 and 4 and the hydraulic double acting assemblies 30 and 32 as will be appreciated from these two figures serve to open and close these assemblies 34 and 36 at the will of the vehicle operator.

Figure 2:
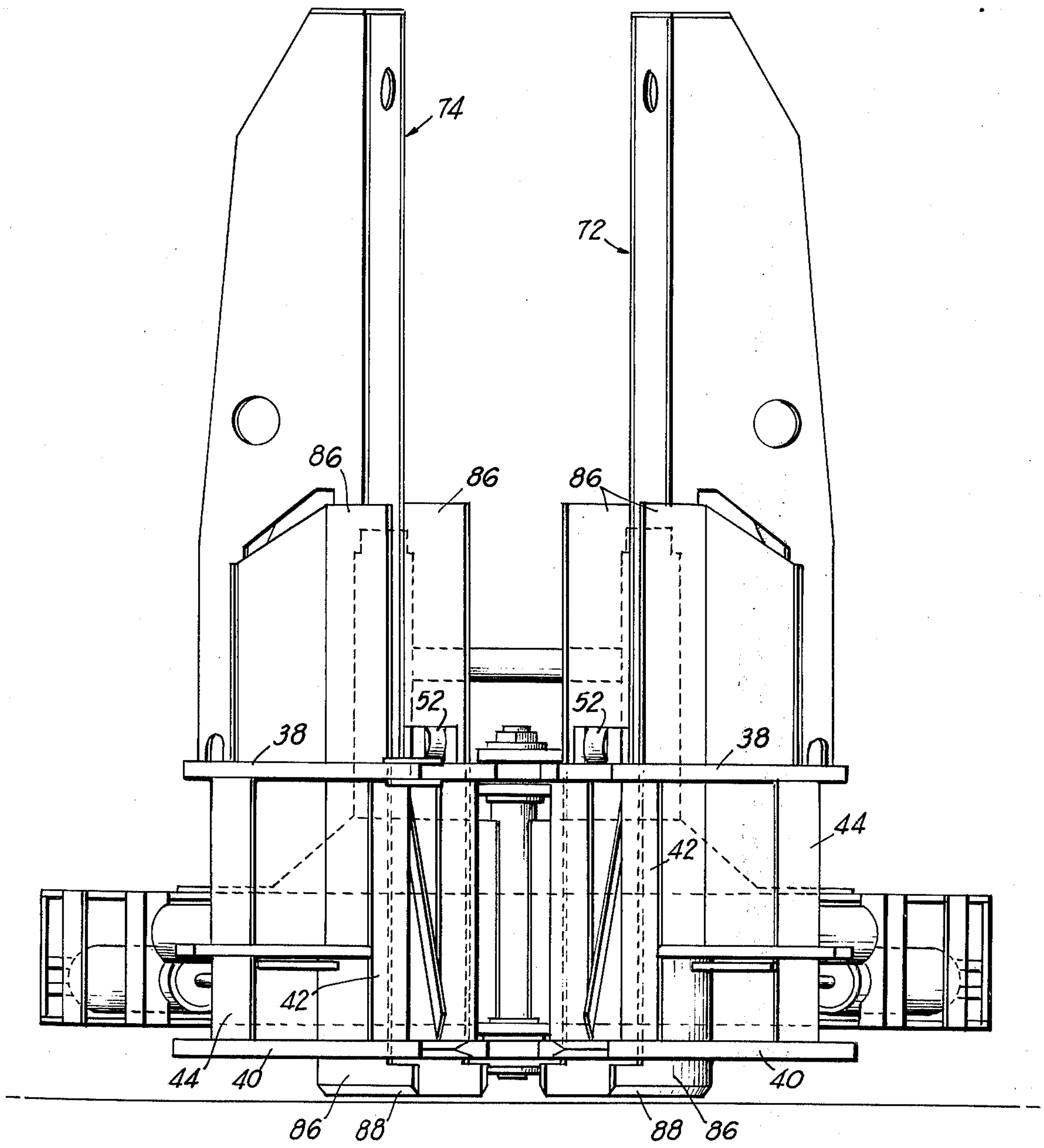
FIG. 2 is a front elevational view of the assembly illustrated in FIG. 1 and showing the gripper jaws in open position.

As can be seen in FIG. 2, each gripper jaw assembly includes an upper plate 38 and a lower plate 40 which are rigidly interconnected by means of various uprights 42, 44 which may form part of the weld-integrated assembly. As can be seen in FIG. 3, each plate 38 is provided with a cut-out to provide the inner arcuate band 48 and the clearance space 50, the purpose of which will be readily apparent. The inner bands 48 of the two upper plates 38 mount guide rollers 52 and 54, again whose purpose will be presently apparent.

Figure 5:
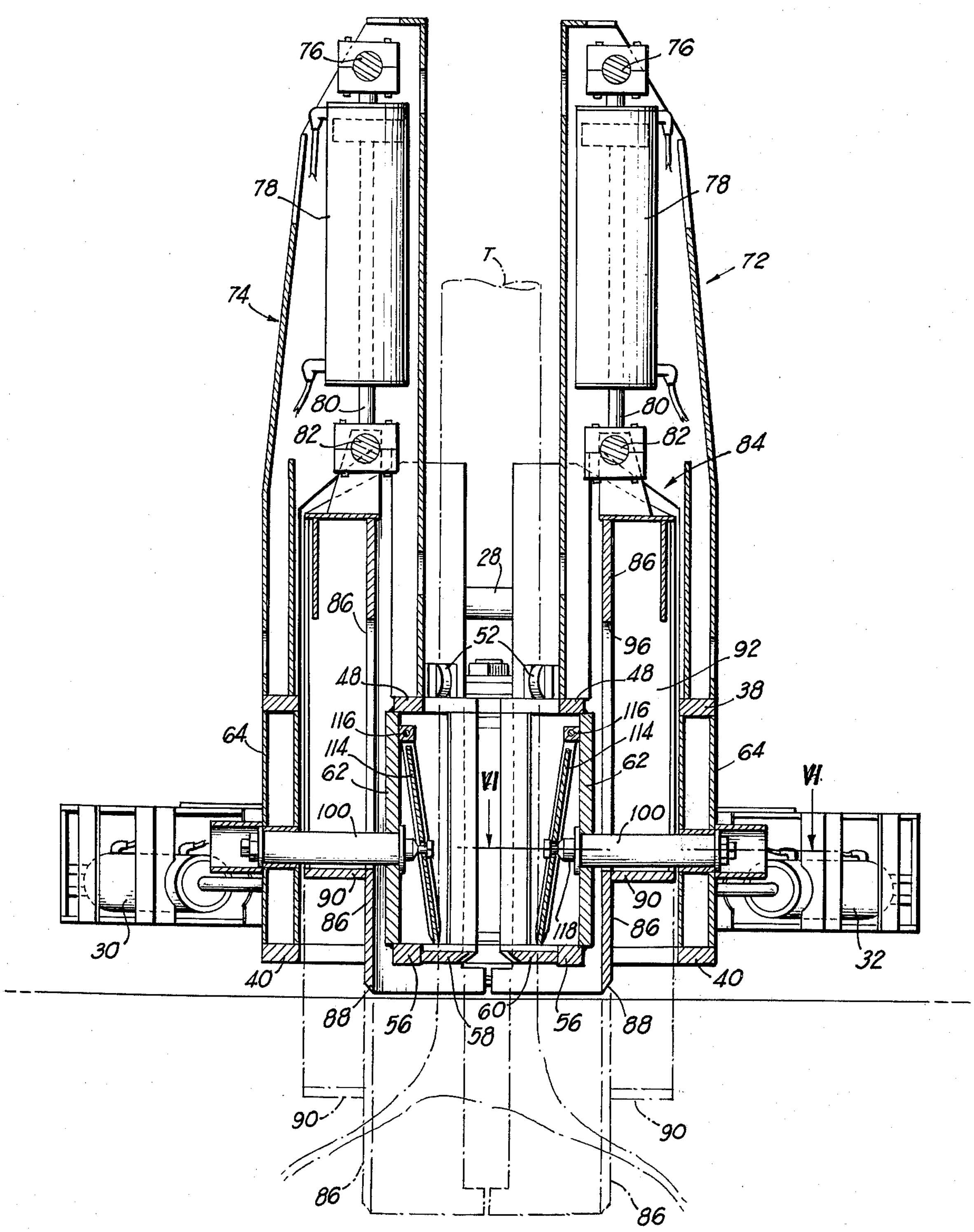
FIG. 5 is a vertical section taken substantially along the plane of Section V—V in FIG. 4.

The inner arcuate portions 56 formed by the cut-outs in the lower plates 40 mount the gripper jaw elements 58 and 60 as is illustrated in FIG. 5, FIG. 5 serving also to illustrate further vertical reinforcing members 62 extending between the upper and lower plates 38 and 40 on the inner sides thereof, and the vertical reinforcing beams 64 on the outer sides thereof. The construction is shown in greater detail in FIG. 6 and FIG. 6 also shows the intermediate, U-shaped plate member 66 forming part of the built up gripper jaw sections and which also carries the pivot pin 68 for each gripper jaw section by means of which the piston rods 70 of the hydraulic actuators 30 and 32 are pivotally attached to the gripper jaw assemblies.

The two upper plates 38 are surmounted by the mast assemblies indicated generally by the reference characters 72 and 74, each of which is formed in the same fashion and which is so built-up as to be substantially hollow and to carry a pivot pin 76 at its upper end by means of which a double acting piston/cylinder assembly 78 is attached thereto. The piston rod 80 of each assembly 78 is pivotally pinned at 82 to the upper end of an associated cutter/pressure foot assembly indicated generally by the reference character 84. Each such cutter/pressure foot assembly includes a C-shaped cutter shell 86 whose lower edge 88 is bevelled or sharpened to provide a cutting edge as may be seen more clearly in FIG. 5.

Figure 6:
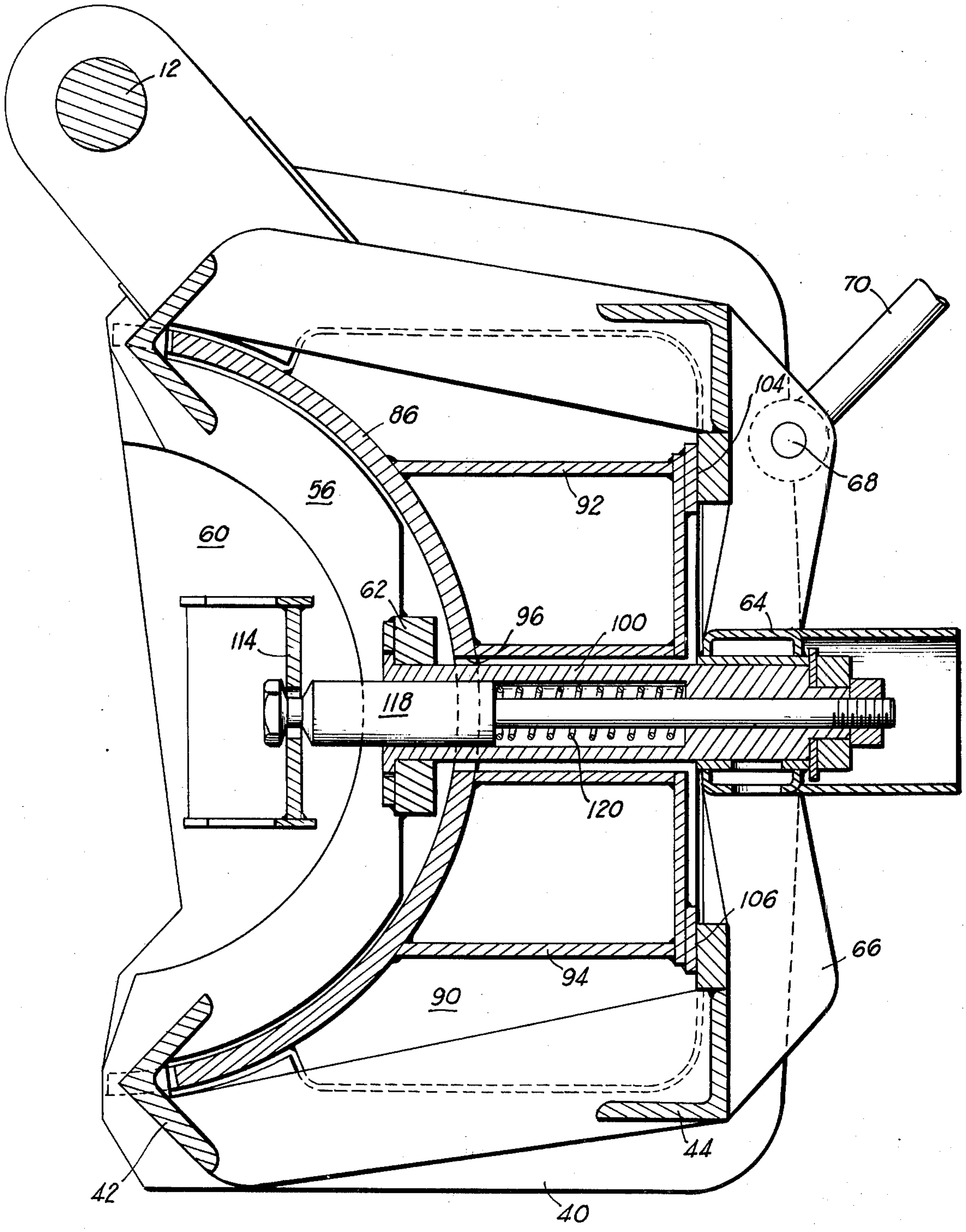
FIG. 6 is an enlarged horizontal section taken substantially along the plane of section line VI—VI in FIG. 5.

As may be seen in FIGS. 5 and 6, each cutter shell 86 is provided with a laterally projecting, outwardly extending horizontal pressure foot plate 90 disposed at some distance above the lower cutting edge 88 thereof which is rigidly joined to its associated cutter shell 86 and is reinforced by suitable built-up box beams 92 and 94 which straddle the vertically elongate slot 96 in each cutter shell 86, the purpose of which is to provide clearance for the structures 100 hereinafter described. The box beams 92 and 94 provide the sliding interfaces at 104 and 106 as shown in FIG. 6 between each gripper jaw section and each cutter/foot section and the previously mentioned rollers 52 and 54 provide guides for the inner surfaces of the cutter shells 86 whereby allowing the cutter/foot assemblies to be guided by their respective gripper jaw assemblies and being movable between substantially fully nested positions therewithin as is illustrated in full line in FIG. 5 to an extended or downwardly projected position as is illustrated in the broken lines in FIG. 5.

Operation of the device as thus far described should now be apparent. The vehicle is maneuvered with the gripper jaws open to receive a tree trunk therebetween and the extractor assembly is lowered onto the ground surface, at which point the gripper jaws are closed by actuating the assemblies 30 and 32 firmly to grip and clamp upon the tree trunk by penetrating the gripper jaw plates 58 and 60 thereinto as illustrated in FIG. 4, the tree trunk being symbolically indicated by the broken line T. At this point, the gripper assembly is positively locked to the tree trunk. Next, the hydraulic actuators 78 are controlled to force the cutter/foot assemblies downwardly as is illustrated by the broken lines in FIG. 5 whereby the cutting edges 88 sever the lateral root system beneath the ground whereas the pressure feet plates 90 increasingly compact the soil and build up a bearing surface which produces a tremendous upward reaction force on the gripper assembly, ultimately to cause the gripper assembly to move vertically upwardly and carry the tree including all of the trunk and the underlying tap root and effecting the extraction of the tree.

The lifting mechanism on the vehicle may now be activated to elevate the extractor assembly complete with tree to a position where its tap root is above ground line. The lift mechanism may now be operated to tilt the extractor assembly and the tree slightly forwardly and then the jaws may be opened to allow the tree to fall forwardly away from the vehicle.

To aid in the tree releasing action of the gripper jaws, the kickers 110 and 112 as shown in FIG. 3 may be employed. Each kicker may take the form of a plate 114 as shown in FIG. 5 which is pivoted at 116 to the inner vertical brace 62 and which is connected intermediate its ends to a rod member 118 which is spring biased normally to position the kicker plate 114 in the position shown in FIG. 3. Details are shown in FIG. 6 wherein it will be seen that the member 100 previously mentioned is recessed to house a spring 120 which is compressed by the rod 118 as the kicker plate 114 is forced inwardly when the associated gripper plate 60 penetrates into the tree trunk and which thereby stores energy tending to aid in releasing the tree trunk when the gripper jaws are swing to open position after the tree has been extracted.

I claim:

1. A tree extractor comprising, in combination:

a gripper jaw assembly adapted to clamp onto a tree trunk above the ground surface, said gripper jaw assembly comprising a pair of sections pivoted together to open and close around the tree trunk;

a cutter and foot assembly guided by and movable vertically downwardly below said gripper jaw assembly to sever the lateral root system of the tree while compacting the ground to provide a bearing support, said cutter and foot assembly comprising a pair of C-shaped cutter shells, one carried by each of said sections to open and close around the tree trunk therewith; and power driven means acting between said gripper jaw assembly and said cutter and foot assembly for forcing the latter downwardly until the bearing support forces the gripper jaw assembly upwardly to extract the tree.

2. A tree extractor as defined in claim 1 including a frame adapted to be carried by a vehicle, said gripper jaw assembly being mounted on said frame.

3. A tree extractor as defined in claim 2 including power means on said frame for swinging said sections to grip and to release a tree trunk.

4. A tree extractor as defined in claim 1 wherein each cutter shell is provided with a pressure foot secured thereto in laterally outwardly projecting relation.

5. A tree extractor comprising, in combination:

a vertically elongate, hollow assembly comprising a pair of vertically elongate sections and adapted to close around a tree trunk in generally encircling relation thereto, said assembly including gripper jaws securely locking the assembly to the tree trunk and a vertically movable cutter and pressure foot guided within said assembly and disposed below said gripper jaws, and drive means for forcing said cutter and pressure foot downwardly to sever the lateral root system of the tree while building up an upward reaction force on said assembly which ultimately raises the gripper jaws to extract the tree.

6. A tree extractor as defined in claim 2 wherein said two sections are pivotally connected together and each carrying a gripper jaw, said cutter and pressure foot comprising two sections, one carried by each section of the hollow assembly.

7. A tree extractor comprising, in combination:

a frame adapted to be attached to a vehicle and movable vertically with respect thereto;

a pair of clamping jaws pivotally mounted on said frame and power means acting on said jaws to open them and to close them into gripping relation to a tree;

cutter means for slicing downwardly around a tree to sever the lateral root system thereof; and force exerting means acting between said clamping jaws and said cutter means for forcing said cutter means downwardly while reacting upwardly on said clamping jaws, whereby the cutter means initially slices downwardly until the reaction force elevates the clamping jaws and said frame to extract the tree, said clamping jaws comprising a pair of mast assemblies vertically guiding said cutter means, said force exerting means being attached to the upper ends of said mast assemblies and extending downwardly therefrom to said cutter means.

8. A tree extractor as defined in claim 7 wherein said cutter means comprises a pair of C-shaped cutter shells, one carried by each mast assembly whereby substantially to encircle the tree when the clamping jaws are closed thereon.

9. A tree extractor as defined in claim 8 wherein each cutter shell is provided with a horizontally projecting pressure foot in upwardly spaced relation to the lower end thereof.

10. A tree extractor as defined in claim 9 including a spring-biased kicker associated with each clamping jaw for kicking the extracted tree away from the jaws when the jaws are opened.

* * * * *